United States Patent [19]

Matsubara et al.

[11] Patent Number: 5,018,953

[45] Date of Patent: May 28, 1991

[54] ROTOR WITH ECCENTRICALLY POSITIONED RETAINER PIN

[75] Inventors: Hidetsugu Matsubara, Matsudo; Yuichi Iguchi, Tokyo; Shinya Tanaka, Koganei; Kazuya Miyashita, Chiba, all of Japan

[73] Assignee: Ishikawajima-Harima Jukogyo Kabushiki Kaisha, Tokyo, Japan

[21] Appl. No.: 507,862

[22] Filed: Apr. 11, 1990

[30] Foreign Application Priority Data

May 18, 1989 [JP] Japan .............................. 1-56470[U]

[51] Int. Cl.$^5$ ...................... F04C 18/16; F04C 29/00
[52] U.S. Cl. .............................. 418/201.1; 403/318; 403/324; 403/355
[58] Field of Search ............................. 418/201.1, 151; 403/318, 319, 324, 355, 378, 379

[56] References Cited

U.S. PATENT DOCUMENTS 1,437,108 11/1922 Jones ................................... 403/319

FOREIGN PATENT DOCUMENTS 59-165987 11/1984 Japan .

Primary Examiner—Leonard E. Smith
Assistant Examiner—D. L. Cavanaugh

[57] ABSTRACT

The center of gravity of a retaining pin which is struck into a retaining-pin receiving hole to join a rotor barrel with a rotor shaft is eccentrically positioned toward the leading end of the pin beyond the axis of the shaft so that upon rotation of the rotor, the pin is forced to thrust toward the bottom of the hole by the centrifugal force, thereby preventing the pin from pulling out of the hole.

4 Claims, 4 Drawing Sheets

ROTOR WITH ECCENTRICALLY POSITIONED RETAINER PIN

BACKGROUND OF THE INVENTION

The present invention relates to a rotor used in a screw type supercharger, a screw type compressor or the like.

For example, in a screw type supercharger as shown in FIGS. 1 and 2 for generating pressurized air to be directed to an engine, a casing 1 accommodates a screw type male rotor 2 having four teeth and a screw type female rotor 3 having six teeth, which rotors 2 and 3 are intermeshingly disposed side by side. The rotors 2 and 3 have shafts 4 supported at their opposite ends by nearings 5 and are rotated by drive force transmitted from an engine to the shafts 4. Rotation of the rotors 2 and 3 causes the air from a suction port 6 at one side of the casing to be compressed and discharged into the engine through a discharge port 7 at the opposed side of the casing 1.

In the rotor 2 or 3, as shown in FIG. 3, the shaft 4 extends through a barrel 8 along the axis thereof. A blind hole 9 is opened on a wall surface of the barrel 8 and diametrically extends through the shaft 4 to the opposed wall portion of the barrel 8. A retaining pin 10 together with an adhesive is struck to be tight-fitted into the hole 9 so as to prevent the barrel 8 from being displaced relative to the shaft 4 in the axial and peripheral directions for example during the rotation of the rotor. In order to prevent the pin 10 from pulling out of the hole 9 due to a centrifugal force resulting from a high rotational speed of the rotor, a pull-out preventive pin 12 is struck into a hole 11 extending through the shaft 4 and pin 10 to join them together.

According to the rotor used in the screw type supercharger described above, the retaining pin 10 is struck for tight-fitting and the pull-out preventive pin 12 is struck to prevent the pin 10 from pulling out. It follows therefore that the hole 9 for receiving the pin 10 must be machined with a higher degree of accuracy so as to permit the tight-fit of the pin 10 and that the pull-out preventive pin 12 and the hole 11 for receiving the same are needed.

In view of the above, the primary object of the present invention is to permit thrust movement of the retaining pin toward the bottom of the retaining-pin receiving hole due to the rotation of the rotor so as to eliminate the accurate machining of the retaining-pin receiving hole for the tight-fit of the retaining pin as well as to eliminate the pull-out preventive pin and the hole for receiving the same.

The present invention will become more apparent from the following description of some preferred embodiments thereof taken in conjunction with the accompanying drawings.

The same reference numerals are used to designate similar parts throughout the figures.

BRIEF DESCRIPTION OF THE ACCOMPANYING DRAWINGS

DETAILED DESCRIPTION OF THE PREFERRED EMBODIMENTS

Figure 4:
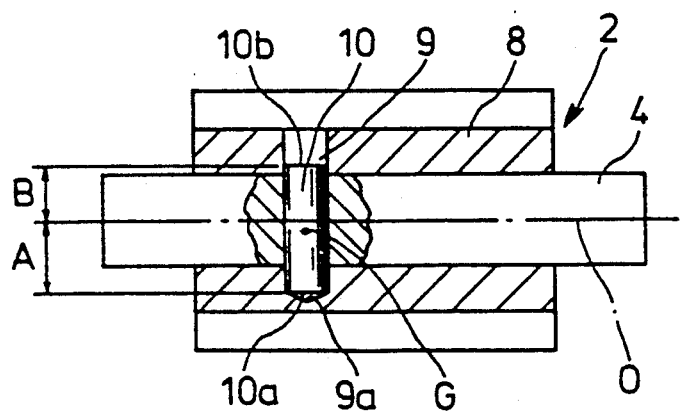
FIG. 4 is a schematic sectional view of a first embodiment of the present invention.

FIG. 4 is a view of the first embodiment and illustrates a male rotor 2 with four teeth used in a screw type supercharger. As in the case of the conventional rotor shown in FIG. 2, the rotor shaft 4 extends through the rotor barrel 8 along the axis thereof; a retaining-pin receiving hole 9 is opened on the wall surface of the barrel 8 and diametrically extends through the shaft 4 to the opposed wall portion of the barrel 8; and a retaining pin 10 is struck into the hole 9 to join the barrel with the shaft 4.

The length of the retaining pin 10 is made shorter than twice the length from the axis 0 of the shaft 4 to a bottom 9a of the hole 9 so that the center of gravity G of the pin 10 struck is eccentrically positioned toward the bottom 9a beyond the axis 0. In other words, when the pin 10 is struck out into the hole 9, the distance A from the leading end 10a of the pin 10 to the axis 0 is longer than the length B from the rear end 10b of the pin 10 to the axis 0. After the pin 10 is struck into the hole 9, the inlet of the hole 9 is caulked by a hammer or the like so as to prevent the pin 10 from pulling out even when the rotor is not rotated.

With the above-described structure, the pin 10 struck up to the bottom 9a of the hole 9 securely joins the barrel 8 with the shaft 4, thereby preventing the barrel 8 from being displaced relative to the shaft 4 in the axial and peripheral directions. The pin 10 itself is retained in the hole 9 without pulling out of the hole 9 during rotation of the rotor about the shaft 4 since the center of gravity G of the pin 10 is eccentrically positioned toward the bottom 9a of the hole 9 beyond the axis 0 of the shaft 4 and therefore the centrifugal force generated is imparted to the pin 9 to thrust the same toward the bottom 9a; the higher the rotational speed of the rotor, the more the thrusting force is imparted to the pin 10 toward the bottom 9b.

Figure 3:
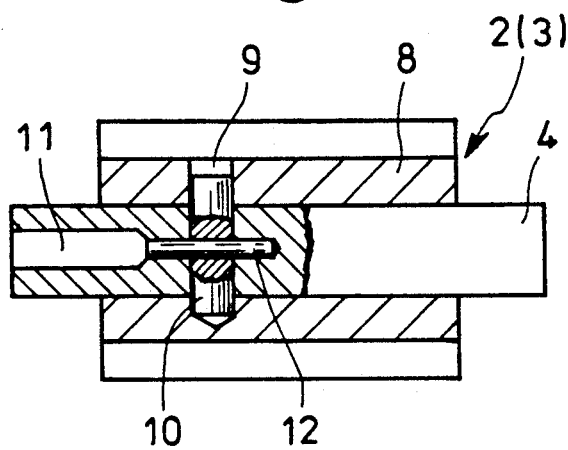
FIG. 3 is a schematic sectional view of a rotor used in the supercharger shown in FIG. 1.

As described above, the retaining pin 10 is struck into the hole 9 such that the center of gravity G of the pin 10 is eccentrically positioned toward the bottom 9a of the hole 9 beyond the axis 0 of the rotor shaft 4, thereby preventing the pin 10 from pulling out during the rotation. It follows therefore that, unlike the conventional rotors as shown in FIG. 3, there is no need of machining the retaining-pin receiving hole to such an extent that the pin 10 is tight-fitted into the hole 9; the hole 9 may be machined to an extent of accomplishing transition-fit of the pin 10. Moreover, there is no need of providing a pull-out preventive pin 12 and a hole 11 for receiving the pin 12.

Figure 5:
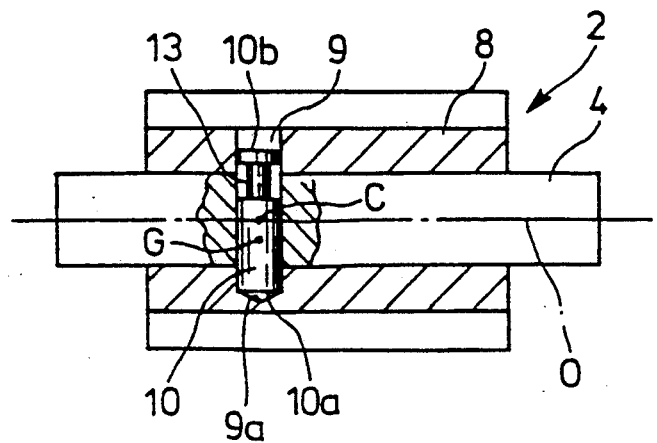
FIG. 5 is a schematic sectional view of a second embodiment of the present invention.

Referring next to FIG. 5, a second embodiment of the present invention will be described. While the first embodiment has the retaining pin 10 in the form of a cylinder, the second embodiment has the pin 10 in the form of an unbalanced column in which the center of gravity G of the pin 10 is eccentric toward its leading end 10a beyond the mid-point C of the axial length of the pin 10. That is, the pin 10 having a recess 13 formed thereon between the rear end 10b and the mid-point C is struck into the hole 9 to join the barrel 8 with the shaft 4.

Because of the recess 13 on the pin 10 adjacent to its rear end 10b, a half of the pin 10 extending between the rear end 10b and mid-point C is lighter in weight than the the remaining half of the pin 10 extending between the leading end 10a and the mid-point C. Therefore, the center of gravity G of the pin 10 is eccentric toward the leading end 10a beyond the mid-point C. When the pin 10 is struck into the hole 9 until the mid-point C of the pin 10 coincides with the axis 0 of the shaft 4, the center of gravity G is eccentrically positioned toward the bottom 9a of the hole 9 beyond the axis 0 of the shaft 4. As a result, the same functions and effects as those obtained in the first embodiment (FIG. 4) are attained.

Figure 6:
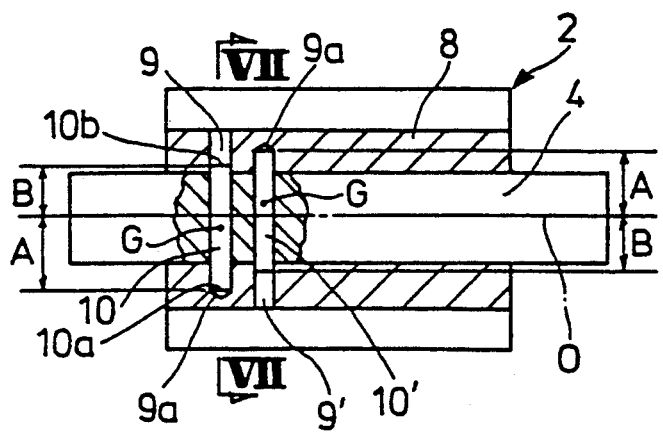
FIG. 6 is a schematic sectional view of a third embodiment of the present invention.
Figure 7:
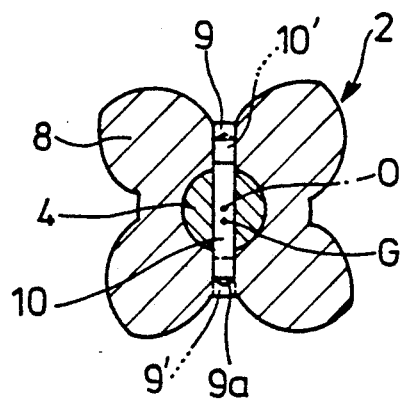
FIG. 7 is a sectional view taken along the line VII—VII in FIG. 6.

Next referring to FIGS. 6 and 7, a third embodiment of the present invention will be described in which the male rotor 2 is substantially similar in construction to the first embodiment (FIG. 4) except that two retaining-pin receiving holes 9 are formed in the rotor and in the vicinity of the discharge port of the screw type supercharger. The one hole 9 extends from a grooved bottom between adjacent ridges of a screw through the axis 0 of the rotor 4 toward an opposed portion of the screw. The other hole 9' extends in symmetrical relationship with the hole 9 and has the same depth and diameter as those of the hole 9. The length of the retaining pins 10 and 10' to be struck into the holes 9 and 9' is made shorter than twice the distance from the axis 0 of the shaft 4 to the hole bottom 9a. As a result, when the pins 10 and 10' are struck out into the holes 9 and 9', the center of gravity G of each of the pins 10 and 10' is eccentrically positioned toward the hole bottom 9a beyond the axis 0 of the shaft 4.

The two retaining pins 10 and 10' are used which are symmetrically struck into the holes 10 and 10' in angularly spaced apart from each other by substantially 180° or in substantially opposite directions. Therefore, any unbalancing force upon rotation of the rotor which may be generated due to eccentricity of the center of gravity G of one of the pins 10 and 10' will be cancelled by eccentricity of the center of gravity G of the other pins 10' or 10, ensuring stabilized rotation of the rotor with causing no vibrations. Because of the pins 10 and 10' being struck in the portion of the rotor in the vicinity of the discharge port or at the high-pressure side of the screw type supercharger, the end clearance between the discharge end of the rotors and the end wall can be maintained constant irrespective of any thermal expansion, ensuring a high degree of discharging accuracy.

Figure 1:
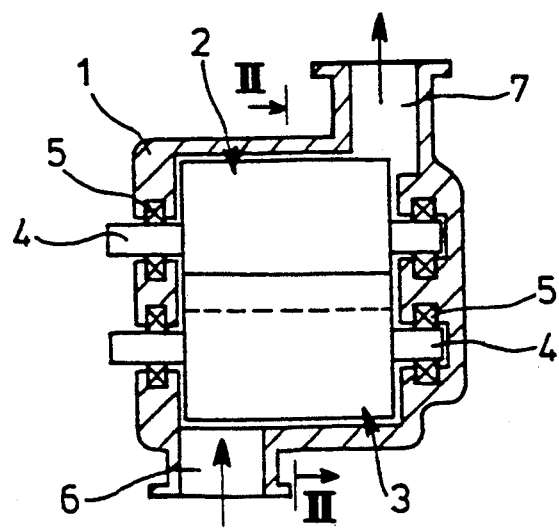
FIG. 1 is a schematic view illustrating a conventional screw type supercharger.
Figure 2:
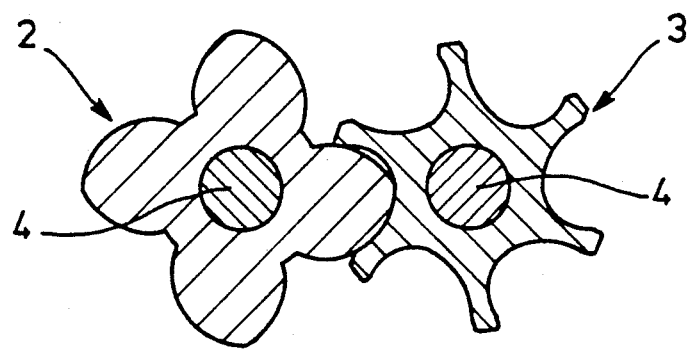
FIG. 2 is a schematic cross-section view thereof taken along the line II—II.

The third embodiment has been described only regarding to the male rotor with four teeth. It is to be noted that the third embodiment may be equally applied to a female rotor with six teeth as shown in FIG. 2 and other rotor having an even number of teeth.

Figure 8:
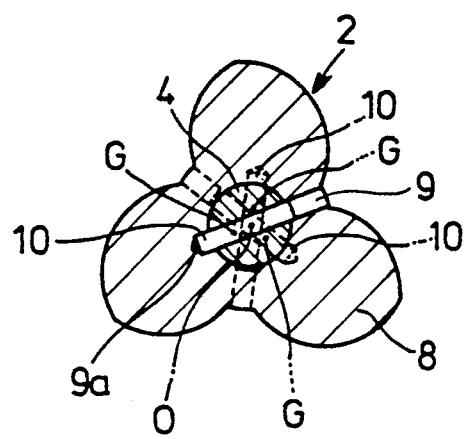
FIGS. 8 and 9 are schematic views of a fourth embodiment of the present invention.

FIG. 8 shows a fourth embodiment of the present invention in which retaining pins 10 are struck into the male rotor 2 with three teeth. In a portion of the rotor in the vicinity of the discharge port, three holes 9 are formed in axially spaced apart relationship and are equiangularly spaced apart by substantially 120° in the peripheral direction. It should be noted that each of the holes 9 extends from the grooved bottom of the barrel 8 through the axis 0 of the shaft 4 toward the opposed portion of the barrel 8. Three pins 10 are struck into the holes 9 such that the centers of gravity G of the respective pins 10 are eccentrically positioned toward the associated hole bottoms 9a beyond the axis 0 of the shaft 4 and have the same distance from the grooved bottom on the barrel 8.

Since the three pins 10 are struck into the holes 9 of the rotor with three teeth, which holes are spaced apart from each other by substantially 120° in the peripheral direction, any unbalancing force which may be generated in rotation of the rotor due to the eccentricity of the center of gravity G of one pin 10 will be cancelled by unbalancing forces due to the eccentricity of the centers of gravity G of the remaining pins 10 struck in different directions. Thus, vibration of the rotor during rotation thereof can be prevented.

Figure 9:
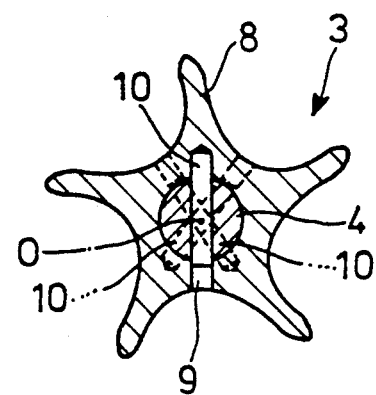

FIG. 9 shows a fifth embodiment of the present invention and illustrates a female rotor 3 having five teeth. From the viewpoint of accuracy and of easiness in machining, retaining pins 10 are to be struck from the grooved bottom of the rotor barrel 8 to pass through the axis 0 of the shaft 4 rather than striking the pins 10 from ridges of the barrel 8. However, with the rotor having five teeth, use of two pins to be struck and angularly spaced apart from each other by substantially 180° in the peripheral direction as in the case of the fourth embodiment shown in FIGS. 6 and 7 or use of three pins to be struck and angularly spaced apart from each other by substantially 120° would result in one or more of the holes 9 being opened on the ridge(s) of the screw type rotor. This would present a very serious problem especially in the case of a female rotor which has thin teeth. Therefore, the structure as shown in FIG. 9 is employed according to the present invention.

Figure 10:
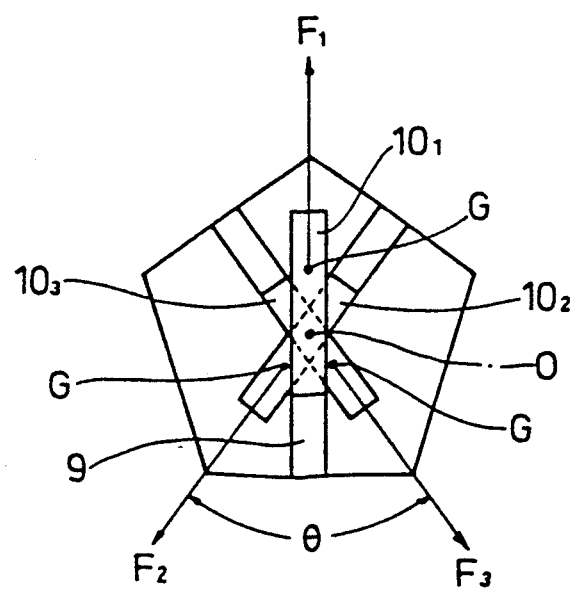
FIG. 10 is a view used to explain the principle for balancing the eccentric forces.

FIG. 10 is a view used to explain the principle of the invention applied to the rotor shown in FIG. 9. In FIG. 10, a first pin $10_1$ is struck from the grooved bottom in a diametrical direction while the remaining pins $10_2$ and $10_3$ are diametrically struck in counter directions; struck depths, diameters or weights of the pins $10_2$ and $10_3$ are selected such that the eccentric force $F_1$ resulting from striking the pin $10_1$ is cancelled by eccentric forces $F_2$ and $F_3$ resulting from striking the pins $10_2$ and $10_3$. The eccentric forces $F_1$, $F_2$ and $F_3$ satisfy the following equation:

$$F_2 = F_3 = \frac{F_1}{2\cos(\theta/2)}$$

In this embodiment, the rotor is in the form of a pentagon and $\theta = 72°$ so that $$F_2 = F_3 = \frac{F_1}{1.618}$$

The fifth embodiment described above with reference to FIG. 9 can attain the same functions and effects as those obtained by any of the first to fourth embodiments described above.

It is to be understood that the present invention is not limited to the above-described embodiments and that various modifications may be effected without leaving the true spirit of the present invention. In the second embodiment described above with references to FIG. 5, the retaining pin 10 is so shown that the mid-point C of the pin 10 coincides with the axis 0 of the rotor shaft 4, but it is to be understood that when the shape of the pin is modified to deviate the center of gravity G further toward the leading end 10a, the position of the midpoint C may not necessarily reach the axis of the rotor shaft. While the fifth embodiment described with reference to FIG. 9 has been described as been applied to the rotor having five teeth, but it is to be understood that the fifth embodiment may be equally applied to any rotor with an odd number of teeth except one. So far the embodiments have been described as being used in a screw type supercharger, but they may be equally applied to rotors in screw type compressors. Retaining pins 10 have been described as being struck in the vicinity of the discharge port, bu the present invention is not limited to such design and the holes may be located at any positions.

As described above, according to the present invention, the center of gravity of the retaining pin which joins the rotor barrel to the rotor shaft is eccentrically positioned toward the leading end of the pin beyond the axis of the rotor shaft. As a result, upon rotation of the rotor, the force for thrusting the pin toward the bottom of the hole is produced by the centrifugal force so that the pin can be prevented from pulling out. Thus the present invention can eliminate machining of the retaining-pin receiving hole to such an extent that the pin is tight-fitted into the hole and can eliminate a pull-out preventive pin and a hole for receiving the same so that the manufacture of the rotor can be simplified.

The present invention may use a plurality of retaining pins each of which is struck such that the center of gravity of the pin is eccentrically positioned toward the leading end of the pin beyond the axis of the rotor shaft. The eccentric forces of the pins are balanced so that the rotor can rotate in a stabilized manner with causing no vibrations. When the retaining-pin receiving holes are located on the discharge side of the machine, the discharge side is not adversely affected by the thermal expansion, thereby maintaining a high degree of discharging accuracy.

What is claimed is:

1. A rotor comprising a barrel, a shaft extending through said barrel along an axis thereof, a blind retaining-pin receiving hole opened on said barrel and diametrically extending through said shaft to an opposed portion of the barrel and a retaining pin which is struck into said hole so as to join the barrel with the shaft, said pin being constructed such that a center gravity of the pin is eccentrically positioned toward a leading end of the pin beyond the axis of the shaft, thereby preventing the pin from pulling out of the hole during rotation of the rotor without the need of any additional pull-out preventive means.

2. A rotor comprising a barrel, a shaft extending through said barrel along an axis thereof, a plurality of retaining-pin receiving holes each opened on said barrel and diametrically extending through said shaft to an opposed portion of the barrel and a retaining pin which is struck into each of said hole so as to join the barrel with the shaft, each of said pins being struck such that a center of gravity of the pin is eccentrically positioned toward a leading end of the pin beyond the axis of the shaft, struck directions and positions of the centers of gravity of the pins being selected such that any unbalancing force resulting from striking one of the pins are cancelled by striking the other pins.

3. The rotor according to claim 2 and having an even number of teeth wherein two retaining pins are struck in opposite directions.

4. The rotor according to claim 2 and having an odd number of teeth wherein three retaining pins are struck from predetermined directions, respectively.

* * * * *